May 24, 1955  K. E. GOLDING  2,708,857
VISUAL INSPECTION DEVICE FOR CURVED GLASS SHEETS
Filed Feb. 10, 1951  2 Sheets-Sheet 1

Inventor
Kenyon E. Golding
Nobbe & Swope
Attorneys

May 24, 1955 K. E. GOLDING 2,708,857
VISUAL INSPECTION DEVICE FOR CURVED GLASS SHEETS
Filed Feb. 10, 1951 2 Sheets-Sheet 2

Inventor
Kenyon E. Golding
Nobbe & Swope
Attorneys

United States Patent Office 2,708,857
Patented May 24, 1955

2,708,857

VISUAL INSPECTION DEVICE FOR CURVED GLASS SHEETS

Kenyon E. Golding, Maumee, Ohio, assignor to Libbey-Owens-Ford Glass Company, Toledo, Ohio, a corporation of Ohio Application February 10, 1951, Serial No. 210,356

7 Claims. (Cl. 88—14)

The present invention relates broadly to the bending of sheets or plates of glass and more particularly to a novel and improved means by which the non-conformity in curvature of glass sheets bent in pairs may be readily and effectively detected by visual inspection.

According to one method of producing laminated safety glass, a pair of glass sheets which have been ground and polished and cut to predetermined size, are assembled in superimposed relation and simultaneously bent upon a suitable mold while in said relation. Upon completion of the bending operation, a plastic interlayer is positioned between the curved glass sheets and the assembly subjected to heat and pressure in an autoclave to bond the laminations into a composite structure.

However, in order to attain an air and moisture impervious bond between the glass sheets and plastic material interposed therebetween, it is essential that the bent glass sheets be properly matched so that there be no voids or areas of separation between said sheets and said interlayer which would allow the autoclave fluid to seep between the layers during the bonding operation or which would result in a breaking away of the glass sheets from the plastic before or after the unit has been in actual use. As is apparent, the presence of void spaces generally results in a product of little, if any, commercial value and not possessive of the protective advantages afforded by present day laminated safety glass.

It is therefore an aim of this invention to provide a method and means whereby any void spaces present between glass sheets bent in pairs or any non-conformity in curvature between the glass sheets can be accurately and speedily detected by visual inspection.

Another object of the invention is to provide an inspection means wherein one or more light sources project parallel lines of light downwardly onto the bent glass sheets, and, if desired, also includes one or more angularly disposed mirrors for facilitating viewing of the images cast by a portion of the light sources.

Another object of the invention is the provision of apparatus for the visual inspection of bent glass sheets in which the parallel lines of light are directed onto the upper and lower surfaces of each glass sheet in a manner whereby two of said lines converge when the sheets exactly conform one to the other and whereby said two lines do not converge when a void space or non-conformity exists between the sheets.

A further object of the invention is the provision of apparatus for visually inspecting glass sheets bent in pairs whereby an operator may rapidly and accurately detect areas of separation between the glass sheets by viewing a portion of said sheets by direct vision and observing another portion thereof by reflected vision, said means being readily adaptable to the inspection of glass sheets of a variety of curves or bends.

Other objects and advantages of the invention will become more apparent during the course of the following description when taken in connection with the accompanying drawings.

In the drawings, wherein like numerals are employed to designate like parts throughout the same:

Figure 1:
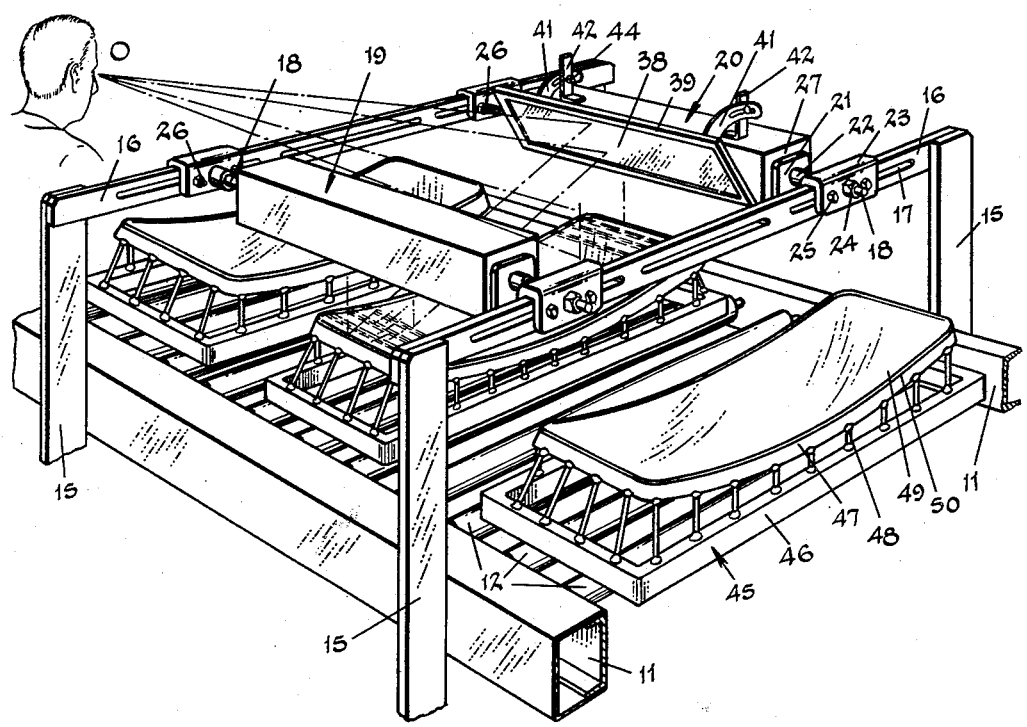
Fig. 1 is a perspective view of apparatus for the visual inspection of glass sheets constructed in accordance with this invention.
Figure 5:
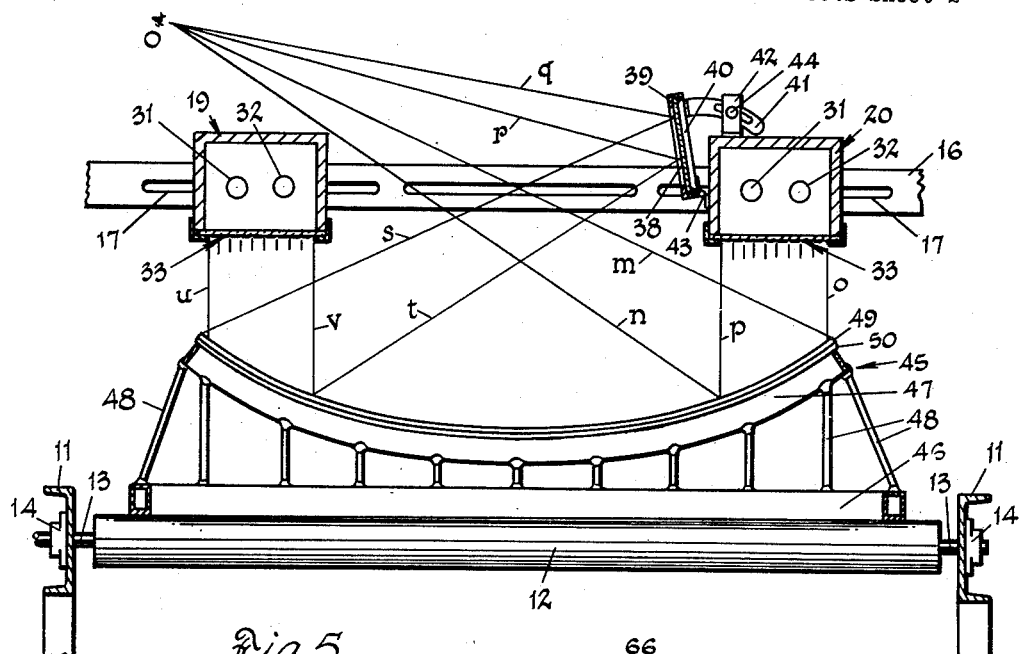
Fig. 5 is a fragmentary transverse section of the apparatus of the invention.

With reference now to the drawings, and more particularly to Figs. 1 and 5, there is disclosed inspection apparatus comprising a supporting framework which may be formed from longitudinally extending, horizontal channel members 11. Carried between said members are a plurality of conveyor rollers 12, the shafts 13 of which are journaled in bearings 14 affixed to the channel members 11.

Extending upwardly adjacent the outer faces of the members 11, and secured thereto if desired, are vertical supporting members 15. Positioned between said latter members and attached to the upper ends thereof are horizontal supporting members 16, each of which is provided with slots 17 for permitting the horizontal slidable adjustment of the hereinafter described light boxes thereon.

Carried by the horizontal supporting members 16 upon shafts 18 extending therethrough are substantially rectangular light boxes 19 and 20. Inasmuch as these light boxes are substantially identical in construction and mounting, a description of one will suffice for both. Thus, the light box 19 is mounted upon the horizontal members 16 by means of circular shafts 18 which pass through the end walls of the box, each shaft being slidably mounted in the slots 17 in the members 16. Supporting the shaft 18 at each end of the light box 19 are end plates 21, adjacent which are collars 22 carried upon said shaft. To afford horizontal adjustment of the light boxes 19 and 20 upon the horizontal members 16, the opposite ends of each shaft are received by a saddle clamp 23 and held secure thereto by means of nuts 24 or other suitable means. After selection of the desired position of the light boxes on the horizontal members 16, said boxes may be rendered substantially immovable on said members by tightening the nuts 25 which are threaded upon bolts 26 passing through the saddle clamps 23 and slots 17 of the members 16.

Figure 2:
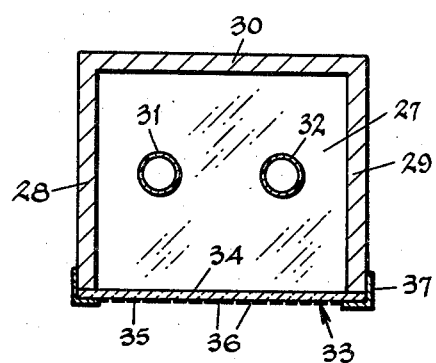
Fig. 2 is a vertical cross section of one of the light boxes used in the apparatus.

As may be seen in Figs. 1 and 2, each light box 19 and 20 is of substantially rectangular shape and comprises end walls 27, side walls 28 and 29, and a top wall 30. Each box may be constructed of wood, such as plywood, or of metal and has mounted therein a pair of light tubes 31 and 32, preferably of the fluorescent type. The bottom wall 33 of each box is formed of a sheet of transparent material 34, such as glass or plastic, the lower surface of which carries a covering 35 of dark and preferably black material. The covering 35 may for example be of black sheet material, such as cloth or paper, and is provided with a series of equally spaced, longitudinally extending slits or openings 36 of sufficient width to allow narrow parallel lines of light to pass therethrough onto the bent glass sheets passing beneath the light boxes. Or, if desired, the covering 35 may be formed by painting longitudinally extending black bands on the under surface of the transparent material 34 and leaving narrow slits 36 of unpainted areas between said bands. In actual practice and by way of example, it has been found that an adequate number of parallel lines of light of the desired width may be allowed to pass through the transparent material 34 by painting on the bottom surface of said material spaced opaque bands approximately one-half inch in width and forming them in a manner whereby the slits 36 are approximately one-sixteenth inch in width. It is preferred that the upper surface of the transparent material be rendered translucent in any well-known manner. To hold the layer of transparent material 34 rigid with respect to the side walls 28 and 29 of the boxes 19 and 20 there are provided angle brackets or braces 37.

In order to grant to the observer a larger field of vision in the inspection of the glass sheets, there is attached to the light box 20, in one form of the invention, a mirror 38. The mirror may be received within a substantially rectangular frame 39 having a rear wall 40 to which may be attached an arm 41 slidably connected to a support 42 affixed to the top wall 30 of the box 20. Although the mirror is shown as substantially flat, a convex mirror may be conveniently used to accord a greater field of vision. Also attached to the rear wall 40 of the frame 39, along the lower portion thereof, is a hinge 43, one section of which is secured to the side wall 28 of the light box 20. Thus, by loosening the bolt 44 in the support 42, the mirror 38 may be vertically adjusted to the desired position and the observer accorded a view of approximately one-quarter of the sheet by reflected vision, in the manner more fully hereinafter set forth.

In operation, glass sheet bending molds 45, each of which may comprise a substantially rectangular base 46 and a shaping surface 47 carried upwardly of said base by a plurality of posts 48, are caused to progress forwardly by means of the conveyor rollers 12. A pair of substantially flat glass sheets or plates 49 and 50 are carried upon the molds and said molds directed through a bending furnace (not shown) wherein said sheets are caused to substantially simultaneously conform to the curvature of the shaping surface 47. Upon completion of the bending operation and removal from the bending furnace, the molds continue their forward movement, and pass beneath the light boxes 19 and 20 carried by the horizontal members 16.

It will of course be appreciated that although the invention is herein described as of particular application to the inspection of glass sheets during movement thereof, it is of equal utility in the optical inspection of sheets which are in a substantially stationary condition. As for example, upon completion of the bending thereof, the glass sheets may be removed from the molds and manually held beneath the light boxes or may be transferred to a substantially stationary support and the visual inspection accomplished while in this stationary mounting.

As each mold 45, with the glass sheets bent in pairs carried thereupon, moves beneath said light boxes, parallel lines of light will be directed downwardly onto said sheets as shown in Figs. 1 and 5. These lines emanate from the light tubes 31 and 32 carried within each light box 19 and 20 and the light rays transmitted by said tubes pass through the transparent material 34 and the slits 36 in the covering 35 whereby the light rays are caused to proceed downwardly from the boxes as parallel lines.

Figure 4:
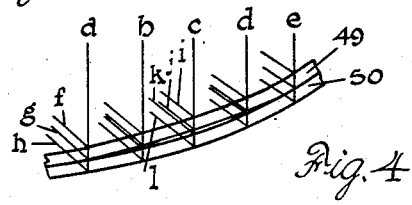
Fig. 4 is a diagrammatic view of a pair of bent glass sheets and the reflections of parallel lines of light from the upper and lower surfaces thereof, showing a triple reflection when intimate contact exists and a quadruple reflection when a void space is present between said sheets.

Referring particularly to Fig. 4, it will be seen that as a plurality of parallel lines of light, designated as "a," "b," "c," "d" and "e," strike the bent glass sheets 49 and 50, said lines will be reflected from the upper and lower surfaces of each of the sheets 49 and 50. The number of reflections of each of said parallel lines will depend upon whether the glass sheets are properly "nested," that is, whether there is an absence of void spaces or spaced areas therebetween. Thus, when there is proper nesting, the parallel lines "a" and "e" will strike the upper and lower surfaces of each sheet 49 and 50 and three reflections "f," "g" and "h" will be directed upwardly therefrom. To explain more fully, when the line of light "a" strikes the upper surface of the glass sheet 49 it will be reflected back as line "f." Also, when the same line "a" meets the lower surface of the sheet 50 it will be reflected upwardly as line "h." However, when the line "a" strikes the lower surface of the sheet 49 and upper surface of the sheet 50, these surfaces being in direct contact when there is proper nesting, the reflections therefrom will be superimposed and therefore will appear as a single line "g."

On the other hand, when a void space or improper nesting of the sheets exists, the reflections of parallel lines from the upper and lower surfaces of the glass sheets 49 and 50 will appear in a different manner. Thus, choosing the line "c" for purposes of example, as it strikes the upper surface of the sheet 49 it will be reflected upwardly as line "i." Also, when said line "c" meets the lower surface of the sheet 50, the reflection thereof will be directed upwardly as line "l." However, when line "c" strikes the lower surface of the glass sheet 49 and upper surface of sheet 50, said surfaces being separated when there is improper nesting, there will be two separate reflections "j" and "k" therefrom and no superimposition as occurs when there is proper nesting. Thus, when there is proper nesting a triple reflection will appear, while improper nesting will be shown by a quadruple reflection from each line of light.

As the pair of bent glass sheets 49 and 50, carried upon a suitable mold 45, pass beneath the light boxes 19 and 20, the viewer will inspect the sheets in the manner shown in Figs. 1 and 5. For the purposes of simplicity of illustration and explanation only two parallel lines of light are shown as directed from each light box 19 and 20. However, it will be appreciated that a plurality of lines emanate therefrom, equal in number to the slits 36 in the covering 35. It should also be understood that in actual practice the reflected lines of light "m" and "n" and "q" and "r" from the glass sheets 49 and 50 will appear not as single lines but as a plurality of lines, said reflected lines being three or four times greater in number than the parallel lines from the boxes 19 and 20, depending upon whether there is proper nesting or not. As for example, if there is proper nesting between the glass sheets in that portion thereof impinged by the line "p," the reflection of said line, that is, line "n" will appear as three lines. Similarly, line "n" will appear as four lines if there is improper nesting.

Thus, as may be seen in Fig. 5, there will be directed to the eyes of the observer O a plurality of lines of light from the light boxes 19 and 20, one series of lines being received by direct vision and another series by reflected vision. To explain, as the observer views the area of the glass sheets 49 and 50 beneath the light box 20 there will be directed to his eyes lines of light "m" and "n" which will be the reflections of the parallel lines of light "o" and "p" respectively from the surfaces of the glass sheets, said latter lines emanating from the box 20 through the slits 36 in the covering 35. In addition, there will be cast into the eyes of the observer O a series of lines of light "q" and "r," which are the reflections received by the mirror 38 of the lines "s" and "t," said latter lines being the reflections of the parallel lines "u" and "v" as they strike the surfaces of the glass sheets 49 and 50.

It may thus be seen that a single operator by simply moving his eyes upwardly and downwardly, from the mirror 38 to the area beneath the lamp box 20, may inspect approximately one half of the sheets by the arrangement of light boxes and mirror shown in Figs. 1 and 5, and experience has indicated that an optical inspection of the end areas of the glass sheets, that is, those areas bounded by the lines of light "*u*" and "*v*" and "*o*" and "*p*," is ordinarily adequate, the reason being that in the majority of cases improper nesting of the bent glass sheets is found in these areas.

As has been noted above, when the observer O views the bent glass sheets 49 and 50 he will see a triple reflection of the parallel lines of light from the surfaces of said sheets when there is proper nesting thereof, and will see a quadruple reflection when improper nesting exists. As has been explained, the reflected lines of light from the lower surface of the sheet 49 and upper surface of the sheet 50 will be superimposed due to the intimate contact therebetween when there is proper nesting, while the reflected lines from said surfaces are separate when improper nesting is present.

Figure 3:
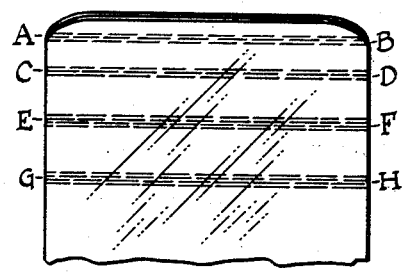
Fig. 3 is a fragmentary plan view of two supermiposed glass sheets showing the reflections of parallel lines of light from a portion of said sheets wherein there is intimate contact and from another portion wherein a void space exists therebetween.

A fragmentary plan view of a pair of bent glass sheets is shown in Fig. 3 and upon reference thereto the reflections of parallel lines of light from the surfaces of the sheets as they appear to the observer may be seen. Thus, the three reflections from the surfaces of the sheets 49 and 50, such as the reflections "*f*," "*g*" and "*h*" from the line "*a*" in Fig. 4, will appear to the observer substantially as shown by the bands A—B and C—D in Fig. 3. Further, the quadruple reflections from the four surfaces of the glass sheets, as for example the lines "*i*," "*j*," "*k*" and "*l*" which are reflections of the line "*c*" of Fig. 4, will appear in the manner shown in Fig. 3 by the bands E—F and G—H. It may thus be seen that if there is proper nesting of the bent glass sheets 49 and 50, this condition will appear as shown by the bands A—B and C—D. However, should there be a void space between said sheets, that is, improper nesting, this undesirable condition will be seen by the observer as the bands E—F and G—H. By this simple and speedy optical inspection the observer or operator may easily detect improper nesting and reject that pair of bent glass sheets at a relatively early stage in the production of laminated safety glass.

By way of a standard to guide the operator in his optical inspection, a tolerance of the thickness of one line of light may be established to facilitate the detection of rejectable pairs of bent glass sheets. Thus, if the operator observes three lines of light reflected there is no basis for a rejection on improper nesting. However, if he observes an additional line of light, that is, four reflected lines, he may be instructed to reject that pair. It will thus be seen that an operator with a relatively small amount of training may make an accurate and speedy optical inspection with a minimum amount of equipment by employing the method and apparatus of the invention.

It will be appreciated, of course, that the condition shown in Fig. 3, wherein proper nesting is shown adjacent the end portions of the glass sheets 49 and 50 and improper nesting inwardly the ends of said sheets, is merely by way of example and that the invention is of equal application regardless of the particular area of the sheets in which improper nesting may occur.

Figures 6, 8:
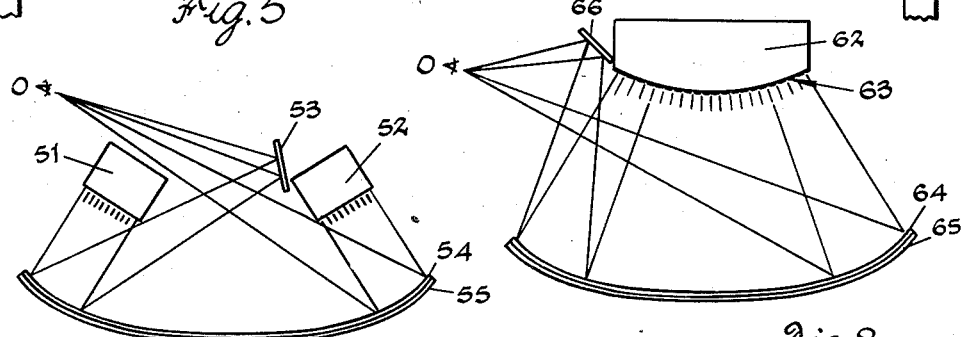
Figs. 6 and 7 are diagrammatic illustrations of pairs of bent glass sheets and modified arrangements of the lamp boxes.
Figs. 8 and 9 are diagrammatic illustrations of pairs of bent glass sheets and the use of a single lamp box.

A modified form of the invention is shown in Fig. 6 and upon reference thereto it will be seen that there is provided a pair of angularly disposed light boxes 51 and 52 and a mirror 53 mounted upon the box 52 in substantially the same manner as above described in connection with the preferred form of the invention. This form of the invention may be used for the inspection of glass sheets 54 and 55 which are of relatively greater length than the glass sheets 49 and 50, and which may possess a greater amount of curvature adjacent the ends thereof.

To permit a more accurate inspection for proper nesting the light boxes 51 and 52 are therefore angularly arranged on members substantially the equivalent of the horizontal supporting members 16 above described, and said boxes direct onto the surfaces of the glass sheets 54 and 55, downwardly and substantially perpendicularly thereto, a plurality of parallel lines of light in the manner shown in Fig. 6. Thus, an observer O, located as illustrated, will by observing that area of the glass sheets beneath the light box 52, receive by direct vision the reflections from the surfaces of the glass sheets, said reflections being produced by the parallel lines of light from the box 52 striking the upper and lower surfaces of the sheets 54 and 55. Also, by casting his eyes at the mirror 53 the operator will observe lines of light which are reflections of the parallel lines of light emanating from the light box 51 and reflected from the surfaces of the glass sheets into the mirror. The lines of light will be reflected from the surfaces of the glass sheets in substantially the same manner as described above with reference to the preferred form of the invention, and the reflections of said lines will appear to the observer O substantially as shown in Fig. 3. In other words, if there is proper nesting between the glass sheets 54 and 55, the reflections will appear as bands A—B and C—D, while if there is improper nesting the reflected lines will appear as bands E—F and G—H. Other features of the preferred form of the invention may be incorporated in this modification.

Figures 7, 9:
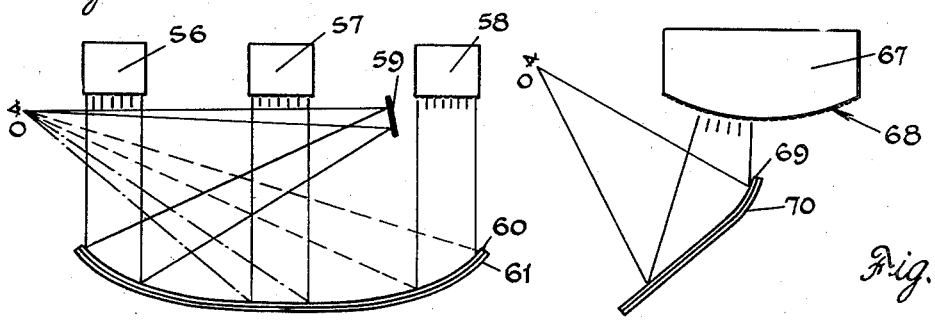

If desired, in order to facilitate the inspection of relatively long bent glass sheets or plates, there may be provided three light boxes 56, 57 and 58, and an angularly disposed mirror 59, as shown in Fig. 7. Utilizing this modification, the observer O will view by direct vision the reflections of the parallel lines of light from the boxes 57 and 58, and will observe by reflected vision the reflections of the lines emanating from the light box 56.

To explain more fully, as the parallel lines of light from the box 58 are directed downwardly onto the glass sheets 60 and 61, said lines will be reflected from the surfaces of said sheets upwardly into the eyes of the observer O, as shown in Fig. 7. Also, parallel lines of light from the box 57 will be reflected from the surfaces of the sheets upwardly to said observer. In addition, the lines of light from the light box 56 will be reflected upwardly from said glass surfaces to the mirror 59, and reflected by said mirror into the eyes of the observer O.

It may thus be seen that by the provision of three light boxes and a mirror angularly arranged between two light boxes, such as for example, the boxes 57 and 58, the observer or operator may inspect two areas of the glass sheets by direct vision and a third area by reflected vision, thereby rendering the inspection operation more efficient and substantially precluding a failure to detect improper nesting in the central area of the glass sheets. Other features of the preferred embodiment of the invention may be included in this modified form.

Or if desired, optical inspection of the pairs of bent glass sheets may be accomplished by one relatively longer light box. Thus, there may be provided as shown in Fig. 8, a light box 62 having a concave shaped bottom 63, through the openings of which there may be directed onto the bent glass sheets 64 and 65 a plurality of substantially non-parallel or slightly diverging lines of light. Attached to one end of the light box in any suitable manner and disposed in angular relation thereto is a mirror 66.

An observer O, located substantially in the position shown, by casting his eyes upon the more distant area of the glass sheets will view thereon a series of parallel lines of light which are the reflections from the surfaces of said sheets of the slightly divergent light lines from the end portion of the box 62 as said lines strike said surfaces. That is, lines of light passing through the concave bottom of the box 62 will be directed in a slightly diverging manner onto the end area of the sheets and will be reflected therefrom to the observer O. In addition, lines of light from that portion of the box 62 adjacent the observer will proceed downwardly to the surfaces of the sheets, will be reflected therefrom upwardly to the mirror 66, and then reflected by said mirror into the eyes of the observer O.

As shown in Fig. 8, the light box 62 is provided with a concave bottom 63 having openings or slits extending throughout its entire length. By this means there are directed downwardly from the boxes 62 lines of light which diverge therefrom to a minor degree, and due to said divergency, produce reflections from the surfaces of the glass sheets 64 and 65 which extend transversely and substantially entirely from end to end longitudinally thereof. Thus, an observer O from the position indicated, could also cast his eyes toward the central area of the glass sheets and by viewing the reflected lines of ligth thereon, be enabled to accurately inspect the sheets across substantially the entire length thereof. It will of course be appreciated that other features of the preferred form of the invention may be made a part of this modification.

The above disclosed forms of the invention are of particular application to the inspection of relatively long glass sheets, such as for example, one piece bent windshields. For the rapid and accurate optical inspection of relatively shorter pairs of bent glass sheets, such as those designed for two-piece windshields, the modification shown in Fig. 9 may be effectively utilized. In this form of the invention there is provided a light box 67 having a concave bottom 68 through which pass slightly divergent lines of light onto a pair of bent glass sheets 69 and 70. Because of the relatively shorter length of this pair of glass sheets, the operator or observer O may inspect substantially the entire length of the sheets by direct vision, that is, without the aid of mirrors. Divergent lines of light from the light box 67 will be reflected directly by the upper and lower surfaces of the sheets to the eyes of the observer, and by viewing the pair of glass sheets will observe either three or four parallel reflected lines of light, the number of lines viewed depending, as has been described, upon whether proper or improper nesting of the sheets exists. As is apparent, the light box 67 may be mounted upon horizontal supporting members 16 as shown in Fig. 1, and other novel features of the preferred embodiment of the invention may be incorporated in this modification, if desired.

Although the invention as described above is of particular application to the optical inspection of pairs of bent glass sheets, such as vehicular windshields, to determine the existence of proper nesting, it has also found considerable utility in the detection of distortion in the surface of the upper glass sheet in the pair of sheets and may also be successfully used to detect proper nesting between the relatively larger curved glass sheets such as are employed in glazing the window openings of present day military and commercial aircraft.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for inspecting pairs of curved glass sheets prior to laminating to detect non-conformity in curvature therebetween, means for supporting the sheets one upon aonther in substantially horizontal position, and light transmitting means mounted above said supporting means, said light transmitting means comprising a layer of transparent material having spaced opaque bands thereon and a light source in back of said layer of material for projecting a plurality of substantially parallel lines of white light directly downwardly onto the surfaces of the glass sheets in a direction generally normal to said surfaces, wherein said lines are reflected upwardly at an angle acute thereto.

2. In apparatus for inspecting pairs of curved glass sheets prior to laminating to detect non-conformity in curvature therebetween, means for supporting the sheets one upon another in substantially horizontal position, and a plurality of light transmitting means mounted above said supporting means, each of said light transmitting means comprising a substantially rectangular box, a layer of transparent material carrying spaced opaque bands forming the bottom of said box and a light source positioned within said box, said light transmitting means projecting a plurality of substantially parallel lines of white light directly downwardly onto the surfaces of the glass sheets in a direction generally normal to said surfaces, wherein said lines are reflected upwardly at an angle acute thereto.

3. In apparatus for inspecting pairs of curved glass sheets prior to laminating to detect non-conformity in curvature therebetween, means for supporting the sheets one upon the other and for carrying them forwardly in a substantially horizontally path, a supporting framework including horizontal members positioned above said path of travel of the sheets, and light transmitting means carried by said members in generally parallel relation to said horizontal path, said light transmitting means comprising a layer of transparent material having spaced opaque bands thereon and a light source positioned in back of said material for projecting a plurality of substantially parallel lines of white light directly downwardly onto the surfaces of the glass sheets in a direction generally perpendicular to said horizontal path as said sheets pass beneath said light transmitting means.

4. In apparatus for inspecting pairs of curved glass sheets prior to laminating to detect non-conformity in curvature therebetween, means for supporting the sheets one upon the other and for carrying them forwardly in a substantially horizontal path, a supporting framework including horizontal members positioned above said path of travel of the sheets, and a plurality of light transmitting means carried by said members in generally parallel relation to said horizontal path, each of said light transmitting means comprising a substantially rectangular box, a layer of transparent material carrying spaced opaque bands forming the bottom of said box and a light source positioned within said box projecting a plurality of substantially parallel lines of white light directly downwardly onto the surfaces of the glass sheets in a direction generally perpendicular to said horizontal path as said sheets pass beneath said light transmitting means.

5. In apparatus for inspecting pairs of curved glass sheets prior to laminating to detect non-conformity in curvature therebetween, means for supporting the sheets one upon the other and for carrying them forwardly in a substantially horizontal path, a supporting framework including horizontal members positioned above said path of travel of the sheets, a plurality of light transmitting means carried by said members, each of said light transmitting means comprising a substantially rectangular box, a layer of transparent material having a translucent surface and carrying spaced opaque bands forming the bottom of said box and a light source positioned within said box and extending longitudinally thereof projecting a plurality of substantially parallel lines of white light between said opaque bands and directly downwardly onto the surfaces of the glass sheets in a direction generally normal to said surfaces as said sheets pass beneath said light transmitting means, and a vertically adjustable mirror carried by one of said boxes in which an operator may observe the reflections of said parallel lines of light.

6. In apparatus for inspecting pairs of curved glass sheets prior to laminating to detect non-conformity in curvature therebetween, means for supporting the glass sheets one upon the other in a substantially horizontal position, means for carrying the sheets forwardly in a substantially straight horizontal path, a supporting framework including horizontal members located above said path of travel of the sheets, a plurality of spaced light transmitting means carried by said members and arranged upwardly of the ends of the glass sheets, each of said light transmitting means comprising a substantially rectangular box, a layer of transparent material carrying spaced opaque bands forming the bottom of said box and a light source positioned within said box projecting a plurality of substantially parallel lines of white light downwardly directly onto the surfaces of the glass sheets in a direction generally normal to said surfaces as said sheets pass beneath said light transmitting means, a vertically adjustable mirror carried by one of said boxes in which an operator may observe the reflections of said parallel lines of light, and means for vertically and horizontally adjusting the position of said light transmitting means on said horizontal members.

7. In apparatus for inspecting pairs of bent glass sheets prior to laminating to detect noncomformity in curvature therebetween, said sheets being bent along their longitudinal axes, means supporting the sheets one upon the other and carrying them forwardly in a substantially horizontal path, with the longitudinal axes of the sheets extending transversely of the path of movement of said sheets, a supporting framework having portions elevated above the path of travel of the sheets, and a plurality of light transmitting means carried by said elevated portions of the supporting framework, each of said light transmitting means comprising a substantially rectangular box extending in the direction of travel of the glass sheets, a layer of transparent material carrying spaced opaque bands forming the bottom of said box and also extending in the direction of travel of the glass, and a light source positioned within said box projecting a plurality of substantially parallel lines of white light in a direction generally perpendicular to said horizontal path directly downwardly onto the surfaces of the glass sheets and transversely of said sheets as the said sheets pass beneath said light transmitting means.

References Cited in the file of this patent

UNITED STATES PATENTS

| | | |
|---|---|---|
| 1,590,532 | Lenouvel | June 29, 1926 |
| 1,837,979 | Mensman | Dec. 22, 1931 |
| 2,015,730 | Rosin et al. | Oct. 1, 1935 |
| 2,239,263 | Waine et al. | Apr. 22, 1941 |
| 2,247,047 | Bishop | June 24, 1941 |
| 2,291,152 | Carter | July 28, 1942 |